3,278,495
TERPOLYMER OF ETHYLENE, PROPYLENE, AND AN UNSATURATED ACID DERIVATIVE FROM THE CLASS OF AMIDES, NITRILES, ANHYDRIDES, ESTERS, AND THE HYDROLYSIS PRODUCTS THEREOF
Karl-Otto Hagel, Gerd Lenke, and Paul Kranzlein, all of Marl, Germany, assignors to Chemische Werke Huels A.G., Marl, Germany
No Drawing. Filed Apr. 12, 1966, Ser. No. 541,958
16 Claims. (Cl. 260—78.5)

This is a continuation-in-part of copending United States patent application Serial No. 156,131, filed November 30, 1961, now abandoned.

This invention relates to adhesive vulcanizable high polymers and to a method of producing same. More particularly, it relates to a method of effecting the polymerization of olefins in the presence of functional derivatives of unsaturated carboxylic acids using Ziegler-type olefin polymerization catalysts, and the polymers produced thereby.

It is well known in the art that alpha-olefins, such as ethylene, propylene, butylene, etc., as well as mixtures of such olefins can be polymerized with the aid of mixed catalysts, as for example, of the type disclosed by Ziegler in German Patent No. 973,626 and also in "Linear and Stereoregular Addition Polymers," Gaylord and Mark, Interscience N.Y., London, 1959. Such catalysts can, for example, be produced from organometallic compounds of elements of Groups I through III of Mendeleev's Periodic Table, as for example, the aluminum alkyls and the aluminum alkyl halides, on the one hand; and compounds of the transition elements of sub-groups IV and VI and VIII of the Periodic Table, as for example, titanium, vanadium or chromium halides, or the ortho-esters or ester-halides of the corresponding acids of these transition elements, on the other hand, the polymerization being carried out at moderate temperatures and pressures, in the absence of water and oxygen, and preferably in the presence of inert diluents. The vulcanization of these polymers under certain conditions yields elastic and visco-elastic polymerizates or mixed polymerizates. The vulcanization, however, is accomplished with considerable difficulty due to the absence of double bonds or other functional groups. The introduction of double bonds by mixed polymerization of the olefins with diolefins, such as butadiene, has met with indifferent success. In addition, the vulcanization of such olefin-diene-mixed polymerizates has not been found to be of technical interest.

Attempts have also been made to react functional derivatives of unsaturated carboxylic acids with linear polyolefins or olefin-mixed polymerizates in the presence of peroxides. This also has been found to be unfeasible because satisfactory vulcanization with metal oxides could not be obtained.

In addition to the lack of satisfactorily vulcanizable polyolefins, it is also well known that polyolefins such as, for example, polyethylene and polypropylene are waxy and do not adhere well to other materials. However, due to the chemical and physical properties of these polyolefins, it would be desirable to incorporate these materials in protective coating compositions for metals, sizing compositions for textiles, etc.

An object of this invention, therefore, is to provide novel copolymers which are satisfactorily vulcanizable and are adhesive, particularly on metals and textiles.

Another object of this invention is to provide a process for the manufacture of these novel copolymers.

Still other objects and advantages will become apparent upon further study of the specification and appended claims.

We have now discovered that vulcanizable high polymer hydrocarbons produced by polymerization of alphaolefins with the aid of Ziegler-type olefin polymerization catalysts, as for example, those produced from organometallic compounds of elements of Groups I through III of Mendeleev's Periodic Table, such as the aluminum alkyls, and more advantageously aluminum alkyl halides, on the one hand, and compounds of the transition elements of subgroups IV through VI and VIII of the Periodic Table, such as titanium, vanadium or chromium halides, or the ortho-esters or ester-halides of the corresponding acids of these transition elements, on the other hand, preferably in the presence of an inert liquid diluent, can be more advantageously obtained by carrying out the polymerization in the presence of functional derivatives of unsaturated carboxylic acids.

The unsaturated carboxylic acid can be selected from those containing 3 to 20, and preferably 3 to 10 carbon atoms; 1 to 5, and preferably 1 to 2 carboxyl groups; and 1 to 5, and preferably 1 unsaturation. Examples of those which we have found to give particularly advantageous results include the derivatives of maleic acid, fumaric acid, acrylic acid, and crotonic acid. Other useful acids are: Itaconic acid, muconic acid, oleic acid, linoleic acid, linolenic acid.

Functional derivatives of these acids which we have found to be particularly useful include, for example, the anhydrides and esters, especially the esters of lower alkanols, e.g., aliphatic alcohols containing 1 to 15 carbon atoms, such as methanol, ethanol, propanol, butanol, octanol, etc. We can also advantageously use acid amides and nitriles, such as for example, acrylamide and acrylonitrile. Also, mixtures of functional derivatives of unsaturated carboxylic acids can be employed. These functional derivatives of the unsaturated carboxylic acids are used in amounts of 0.1 to 80, and preferably 1 to 10 mol percent, based on the mols of the monomeric olefin or olefins polymerized.

A difficulty in using these functional derivatives of unsaturated carboxylic acids is that they are only slightly soluble in organic hydrocarbons or hydrocarbon mixtures which are usually employed as the inert liquid polymerization medium. This difficulty, however, can be overcome according to this invention by preferably continuously adding the functional derivatives of the unsaturated carboxylic acids during the polymerization at a rate determined by their consumption during the polymerization.

It is also feasible to dissolve the functional derivatives of unsaturated carboxylic acids in suitable solvents, such as carbon tetrachloride, or chlorobenzene to get as concentrated solutions as possible, and then to add these solutions to the polymerization mixture either as a single batch or intermittently, or continuously. The optimum manner of the addition will depend upon the amount of unsaturated carboxylic acids and their functional derivatives which remain in solution in the resulting solvent mixture. This can easily be determined by a preliminary test.

It is also possible to disperse the functional derivatives of unsaturated carboxylic acids in an inert diluent and to add the resulting dispersion to the polymerization mixture, which in some cases, can be particularly advantageous.

The mixed catalysts for polymerization, according to Ziegler, consist essentially of the well-known above-mentioned catalyst systems, prepared from the organometallic compounds of the metals of Groups I through III of the Periodic Table, as for example, aluminum alkyls or aluminum alkyl halides, on the one hand, and compounds of the transition elements of sub-groups IV through VI and VIII of the Periodic Table, and especially titanium, vanadium, and chrominum halides and the ortho-esters, and esters of halides of the corresponding acids of these transition elements, on the other hand. Especially advantages in the production of elastomers or visco-elastomers of mixed polymers of the olefins in the use of mixed catalysts of vanadium oxychloride and/or vanadium tetrachloride and/or their partial esters, on the one hand, and aluminum alkyls and/or aluminum alkyl chlorides, and in particular, ethyl aluminum sesquichloride, on the other hand.

The range of the $Me^{I-III}$ $Me^{IV-VIII}$ mol ratios of these catalyst components, in this invention, is 1:1 to 200:1, preferably 5:1 to 50:1, the preferred range being higher than generally employed in the Ziegler polymerization. The catalyst is employed in quantities of from 1 to 95% in relation to the quantity of the converted monomeric olefins.

The polymerization is usually conducted in the presence of inert diluents, but it can be carried out in the absence thereof. Suitable inert diluents include, for example, saturated aliphatic hydrocarbons, such as hexane, heptane, cyclohexane, isopropylcyclohexane, gasoline fractions, diesel oil fractions, or chlorinated hydrocarbons, for example, carbon tetrachloride, chloroform and/or chlorobenzene, aromatic hydrocarbons, and the like. Aromatic hydrocarbons can be used but are less satisfactory because they react with olefins in the presence of the Friedel-Crafts catalysts. The inert diluents can be used, if desired, in amounts ranging from 1 to 20, but preferably 5 to 15 times that of the reactive monomeric olefin.

The polymerization is carried out at pressures ranging from 0.5 to 100 atmospheres, preferably from 1 to 10 atmospheres, and at temperatures ranging from $-100°$ to $+100°$ C., preferably from $-20°$ to $+60°$ C.

During the course of the polymerization operation the monomeric olefin, and in particular ethylene, propylene and butylene, or mixtures thereof, the mixed Ziegler-type catalyst, if necessary, in the form of solutions or suspensions thereof, or the components of the mixed catalysts in inert solvents, the functional derivatives of the unsaturated carboxylic acids or solutions or suspensions thereof, and possibly the inert diluents, can be supplied continuously or in any desired sequence.

A preferred process for the mixed polymerization of ethylene and/or propylene and/or butylene to form an elastomeric or viscoelastic mixed polymer in the presence of maleic acid anhydride and/or any other functional derivatives of an unsaturated carboxylic acid is as follows: an inert diluent such as hexane is saturated at the polymerization temperature and pressure with the gaseous monomeric olefins, preferably in reciprocal ratio to their polymerization capacity. That is, before the main polymerization is initiated, the diluent is saturated with a gaseous olefin mixture comprising ethylene on the one hand, and propylene and/or butylene on the other hand, in mol ratios of 1:2 to 1:200, preferably 1:4 to 1:20. Additional olefin mixture is then introduced, preferably consisting of ethylene on the one hand, and propylene and/or butylene on the other hand, in mol ratios of 1:0.8 to 1:3, preferably 1:0.9 to 1:2.

The use of the latter proportions of olefins ensures that the polymerization process will proceed free of deposits and result in high yields of the desired polymer. If the mol ratio of etheylene to propylene exceeds 1:0.8, the resulting polymer contains undesired amounts of crystalline components; with proportions greater than 1:3, however, the susceptibility to oxidation increases due to the large number of tertiary carbon atoms formed. Use of the preferred range of olefins ensures an absolute optimum with respect to the polymerization and the mechanical properties of the polymer.

Contemporaneously with the latter olefin addition, the two catalyst components are continuously added according to the progress of the polymerization and in a constant ratio relative to each other. The catalysts are preferably added in dissolved form in an inert diluent. 0 to 30, preferably 5 to 20 minutes after the catalyst components are first introduced, the unsaturated carboxylic acids or derivatives are added in appropriate solution or suspension. Preferably, the acids or derivatives thereof are added in an amount of 0.005 to 0.5, more preferably 0.01 to 0.1 mol per mol of olefin added.

Processing of the polymers produced is carried out in a conventional manner, preferably by decomposing the mixed catalyst residue with water, alcohol or other suitable polar compound or complex-forming compound, removing the decomposition products and the diluent, and then washing the polymerizate. By mixing the polymerizate solution or dispersion with water, dispersions or emulsions usually result. According to the amount of unsaturated functional derivatives of dicarboxylic acids introduced, and the hydrophilic groups thereby existing in the polymerizate or created by hydrolysis of the functional derivatives, either the inert diluent or the water constitutes the continuous phase. The inert diluent can be separated from this emulsion or dispersion, preferably by treating with steam, whereupon the polymer obtained in friable form is then filtered and dried to obtain a product susceptible of further processing. The dispersions, during the course of further processing, can be made neutral or alkaline by the addition of neutralizing agents. Thereby "Water-in-Oil" dispersions can be converted into "Oil-in-Water" dispersions, which frequently is advantageous.

Additives, such as fillers, dyes, stabilizers, and the like needed for the further processing can, if desired, be added to the polymers during the processing, or even before or during the polymerization.

The polymers produced can be effectively vulcanized by heating the same in the presence of metal oxides, such as zinc oxide, lead oxide, magnesium oxide, aluminum oxide, etc., either alone or together with other synthetic or natural rubbers. It is also advantageous to add organic peroxides and reinforcing fillers, as well as sulfur and accelerators during vulcanization. It was unexpected that it would be possible to introduce functional derivatives of unsaturated carboxylic acids into polymers of olefins, in the manner described, because these derivatives are known to react with the catalyst components and especially with the organometallic compounds of aluminum.

The polymers produced by this invention include polymers of mono-alpha-ethylenically unsaturated monomers, preferably hydrocarbons having from 2–8, preferably 2–4 carbon atoms and mixtures thereof, polymerized with functional acid derivatives of unsaturated carboxylic acids having from 3–20 carbon atoms, 1–5 carboxyl groups and 1–5 vinylic bonds. In general, the linear random copolymer contains the monomers in a ratio of 100 mols olenic monomer and 0.1–80 mols functional acid derivative.

The preferred functional acid derivatives are amides, nitriles, anhydrides, and esters of aliphatic alcohols having 1–15 carbon atoms.

The molecular weight of these polymers is 30,000 to 500,000, preferably 80,000 to 200,000. The preferred polymers are those containing not more than one double bond per 1000 carbon atoms, and which contain 2–20, preferably 5–10 functional groups per 1000 carbon atoms.

After the polymers are formed, it is possible to increase their adhesiveness even further by converting the acid derivative portions of the molecule to the free acid. This can be realized, for example, by saponification of the anhydride groups by refluxing an aqueous dispersion of the polymer solution and steam distilling the organic solvent or diluent. To saponify the ester groups, there should be added mineral acid, as for example sulfuric or hydrochloric acid, in amounts that will result in 0.5 to 2 molar solutions after mixing with the water phase.

Preferred embodiments of this invention include a coated article comprising a metal coated with the polymers of this invention, as well as a textile sized with these same polymers, the preferred polymers being those having free carboxylic acid portions.

The specific examples given below are cited for the purpose of illustrating our new process and the products obtained thereby. It is understood, however, that we are not limited either to the use of the specific ingredients shown therein or to the specific reaction conditions employed as our invention pertains broadly to the use of functional derivatives of unsaturated carboxylic acids in effecting polymerization of olefinic compounds with the Ziegler-type polymerization catalysts.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever. In the following examples, the expression "l./h." refers to liters per hour.

Example I

Into a two liter glass flask, provided with stirrer and sealed to prevent admission of air and moisture, and containing 0.5 liter of hexane, there was passed for a period of 15 minutes at a temperature of 20° C. and at 1 atmosphere pressure a gaseous stream of ethylene at the rate of 6 l./h. and propylene at the rate of 24 l./h. From two separate containers there was then added dropwise a solution of 4.5 g. of ethyl aluminum sesquichloride (about 18 millimols), in about 150 cc. of hexane, and a solution of 1 g. $VOCl_3$ (about 6 millimols), in about 150 cc. of hexane.

Polymerization began after addition of the first few drops of the catalyst components, as was evidenced by a faint violet color of the polymerization medium and the complete absorption of the gaseous olefins. Simultaneously, the rate of olefin addition was adjusted to 10 l./h. each for the ethylene and the propylene. The rate of catalyst addition was adjusted so that there was practically no unreacted gas. The polymerization temperature was maintained at 20° C. by cooling. Fifteen minutes after the beginning of the polymerization, a solution of 4 g. maleic acid anhydride in 0.5 liter of carbon tetrachloride was added continuously dropwise. After about 2.5 hours, both the solution of catalyst component and the solution of maleic acid anhydride has been consumed. Addition of the two gaseous monomers and the concomitant polymerization thereof were continued until the total unconverted gas reached 5 liters (about 15 minutes during which time about 9% of the total amount of olefins was consumed).

After the polymerization was terminated, the viscous turbid solution of polymer was mixed, while constantly stirring, with isopropanol until all of the polymer was precipitated. The recovered polymer was washed thoroughly several times with isopropanol while stirring. Upon vacuum drying, there was obtained 70 g. of a yellowish-green vitreous polymerizate which was sticky as contrasted to polymerizates of ethylene-propylene prepared without using carboxylic acids. The polymerizate contained, according to the IR-analysis, about 50 mol percent of propylene; and homopolymers, i.e. crystalline polyethylene, or isotactic polypropylene were not detected in the spectrum. If such homopolymers are present, they constitute less than 1% of the polymerizate. The spectrum also showed components of carboxyl and carboxylic anhydride groups, as well as carboxylic acid salt groups. The saponification number, measured in benzene solution, was 38.3 (calculated on combined anhydride of 3.3% by weight). Accordingly, about 60% of the amount a maleic acid anhydride added was copolymerized. Oxygen analysis: 2.3% by weight of oxygen.

If instead of adding 10 l./h. each of ethylene and propylene there is added a substantially smaller proportion of propylene, for example 10 l./h. ethylene with 6 l./h. propylene, there is an increased danger of forming undesired crystalline components in the polymer.

If the proportion of propylene added is too high, for example 10 l./h. ethylene and 40 l./h. propylene the excessive quantities of the propylene will not react to form the desired copolymer. It is, therefore, preferred to use mol ratios of ethylene to propylene of 1:0.8 to 1:3, preferably 1:0.9 to 1:2.

Example II

At a temperature of 0° C., the remaining conditions being the same as in Example I, 0.9 liter of carbon tetrachloride (freshly distilled and free from water and alcohol), containing dissolved therein 4 g. of freshly distilled maleic acid anhydride, was saturated for about 20 minutes with ethylene (6 l./h.) and propylene (24 l./h.). Then solutions of (a) 7 g. of ethyl aluminum sesquichloride (22.6 m. mol) in 200 cc. carbon tetrachloride and of (b) 1.4 g. of $VOCl_3$ in 200 cc. of carbon tetrachloride were added separately dropwise.

About 50 cc. of solution (a) was added at the beginning and the remainder was continuously added dropwise during the polymerization as in Example I. The olefin was added at the rate of 10 l./h. After 2 hours of polymerization at 0° C., precipitation was effected with methanol. After drying, there was obtained 74 g. of polymerizate containing about 50 mol percent of propylene; polyolefin homopolymers were not detected (that is, less than 1%). Signs of carboxylic anhydride groups as well as carboxylic acid salts were found in the IR-spectrum of the polymerizate. The saponification number was about 32 (corresponding to about 2.8% maleic acid anhydride in the polymerizate).

Example III

Into 400 cc. of carbon tetrachloride at 0° C. was passed, for a period of 20 minutes, a gaseous stream of ethylene at a rate of 6 l./h. and propylene at a rate of 24 l./h. While maintaining the temperature at 0° C., the following solutions were continuously and separately added dropwise:

(a) 2 g. of ethyl aluminum sesquichloride dissolved in 150 cc. carbon tetrachloride;
(b) 1.4 g. of $VOCl_3$ dissolved in 100 cc. of carbon tetrachloride;
(c) 4 g. of maleic acid anhydride dissolved in 500 cc. of carbon tetrachloride.

The polymerization was continued for 2 hours and 10 minutes. Precipitation of the polymerizate was then effected by the addition of methanol. Yield: 54 g. of friable sticky polymerizate. The IR-spectrum was the same as in Example II. The saponification number was about 50, corresponding to about 4.5% of maleic acid anhydride in the polymerizate.

Example IV

Into 350 cc. of freshly distilled water-free chlorobenzene at 0° C. was introduced gaseous ethylene and propylene as described in Examples II and III. The following solutions were then added:

(a) 40 g. ethyl aluminum sesquichloride (about 160 m. mol) dissolved in 100 cc. of hexane;
(b) 0.18 g. of $VOCl_3$ (about 1 m. mol) dissolved in 25 cc. hexane;
(c) 30 g. of maleic acid anhydride dissolved in 500 cc. of freshly distilled chlorobenzene.

At the beginning of the operation, about half of the total amount of ethyl aluminum sesquichloride was added to the reaction medium. Upon the addition of a few drops of the $VOCl_3$ solution, polymerization began. After the start of the polymerization, the ethylene-propylene mixture introduced into the reaction vessel was adjusted to 10 l./h. All three solutions were then added continuously as needed dropwise during the entire period of the polymerization. The temperature was maintained at 0° C. After 2 hours and 40 minutes, the polymerization was stopped by the addition of methanol which precipitate the polymerizate. The yield after drying was about 70 g. The IR-spectrum showed an ethylene-propylene copolymer, free from polyethylene homopolymers and containing considerable amounts of carboxyl groups, partly as anhydride and partly as salts.

*Example V*

Gaseous ethylene and propylene were passed into 800 cc. of hexane at 20° C. as described in Examples II and III. The following solutions were then added:

(a) 10 g. ethyl aluminum sesquichloride (about 40 m. mol) dissolved in 250 cc. hexane;
(b) 0.36 g. of $VOCl_3$ (about 2 m. mol) dissolved in 50 cc. hexane;
(c) 5 g. of maleic acid anhydride dissolved in 100 cc. of chlorobenzene.

At the beginning of the operation about one-half of the total amount of ethyl aluminum sesquichloride was added to the reaction mixture. After the addition of the first few drops of $VOCl_3$, polymerization began. The ethylene-propylene mixture was then adjusted to 10 l./h. each. The three solutions described above were then added as described in Example IV. The temperature during the polymerization was maintained at about 20° C. After 3 hours, polymerization was halted by the addition of water to the reaction mixture. After addition of 500 cc. of water, a viscous milky dispersion was obtained which remained stable on standing overnight. The residue was then separated into two equal parts.

(1) One part was adjusted to a pH of 8 by the addition of 10 g. of $NaHCO_3$ in 200 cc. of water and then subjected to steam distillation to remove the organic solvents. At the end of this operation the polymer was obtained in the form of very fine particles which tended to agglomerate when dried. The product was sticky. Yield: 42 g.

(2) The other fraction was steam distilled without neutralization (pH 3) as described in 1. The product was practically as finely divided as the product above described. Yield: 41 g. The IR-spectrum of the polymerizate revealed in addition to the characteristic bands of ethylene-propylene-copolymers, the presence of carboxylic acid salts.

*Example VI*

Propylene (20 l./h.) was passed into 800 cc. of hexane at a temperature of 20° C. for 30 minutes. The following solutions were then added as needed:

(a) 10 g. of ethyl aluminum sesquichloride (about 40 m. mol) dissolved in about 200 cc. of hexane;
(b) 0.2 g. of $VOCl_3$ (about 1.2 m. mol) dissolved in 50 cc. of hexane;
(c) 10 g. of maleic acid anhydride dissolved in 200 cc. of chlorobenzene.

Addition of solution (c) was started a few minutes later. During the polymerization, the propylene mixture was introduced at 20 l./h. and the temperature was held at 20° C. After about 2 hours, all three of the solutions had been added. After 2.5 hours the polymerization was stopped and the polymerizate precipitated by the addition of methanol. The polymerizate was thoroughly washed with methanol and vacuum dried. Yield: 70 g. of a highly viscous product, showing in the IR-spectrum the bands of atactic polypropylene by strong absorption of carboxylic acid salt, free carboxylic acid and carboxylic acid anhydride groups. No isotactic polypropylene homopolymer was detected.

Under analogous conditions propylene alone, for all practical purposes, could not be polymerized, or only with very small yield. Ethylene formed mixed polymers with maleic acid anhydride only under conditions similar to propylene. By mixing polymer dispersions with water there could be obtained if desired, pasty sticky dispersions.

*Example VII*

Into 800 cc. of hexane maintained at a temperature of 0° C. was passed for 30 minutes a monomeric mixture of 6 liters of ethylene per hour and 24 liters of propylene per hour. The following solutions were then continuously added as needed:

(a) 20 g. ethyl aluminum sesquichloride dissolved in 200 cc. of hexane;
(b) 1.5 g. of $VOCl_3$ dissolved in hexane;
(c) 10 g. of acrylonitrile (about 190 m. mol).

After the start of the polymerization the supply of ethylene and propylene was adjusted to 10 l./h. each. The polymerization was effected at 0° C. and was completed after about 2.5 hours. Precipitation was accomplished with isopropanol. Yield: 75 g. of a visco-elastic polymerizate.

The IR-spectrum shows, in addition to the known chemical bonds of ethylene-propylene mixed polymerizates, strong nitrile bonds from which can be concluded that 5 to 10 weight percent of acrylonitrile are present in the polymerizate. The elementary analysis shows 2.5% $N_2$, corresponding to 9.5% polymerized acrylonitrile.

*Example VIII*

Proceeding according to Example VII, a mixture of 3 liters ethylene and 12 liters propylene is introduced into 800 cc. hexane during 30 minutes at 0° C. Thereafter one adds continually, as desired:

(a) 10 g. ethyl aluminum dichloride in 100 cc. hexane;
(b) 0.7 g. $VOCl_3$ dissolved in 50 cc. hexane;
(c) 5 g. ethyl acrylate in 50 cc. hexane.

After polymerization has started, the rate of introduction of ethylene and propylene is changed to 10 l./h. After about 2 hours, the addition of the catalyst is finished. The polymerization is continued with further addition of monomers for approximately 30 minutes. The viscous solution obtained is then mixed with isopropanol and methanol until the entire mixed polymerizate is precipitated. After having been stirred for several hours, this mixed polymerizate is filtered off, washed and once more stirred overnight with methanol. After separation and vacuum drying, 50 g. of a plastic moldable, sticky, transparent product are obtained. The reduced specific viscosity in toluene is 1.4. From the IR-spectrum the composition of the mixed polymerizate to 40 weight percent propylene, approximately 5 weight percent ethyl acrylate can be calculated. The rest is ethylene. Double bonds are no longer recognizable nor are homopolymeric isotactic polypropylene or homopolymeric crystalline polyethylene. By X-ray analysis, the product is seen to be amorphous, too. 98 weight percent of the mixed polymerizate can be dissolved in tetrahydrofuran. The IR-spectrum of the constituent soluble in tetrahydrofuran is identical to the IR-spectrum of the basic product.

*Example IX*

Proceeding in accordance with Example VIII, one adds continually, as desired:

(a) 20 g. aluminum ethyl dichloride in 200 cc. hexane;
(b) 1.5 g. $VOCl_3$ in 100 cc. hexane;
(c) 10 g. ethyl acrylate in 100 cc. hexane.

After approximately 3 hours polymerization, 65 g. of a transparent very sticky, plastic-flexible product are obtained having a specific viscosity of 1.0 in toluene. According to the IR-spectrum, the mixed polymerizate obtained consists of 50 weight percent propylene and 10 weight percent ethyl acrylate. The rest is ethylene. 59 is the determined saponification number according to 10.5 weight percent of incorporated ethyl acrylate.

Example X

Proceeding in accordance with Example VIII, one continually adds as desired:

(a) 12 g. ethyl aluminum sesquichloride in 100 cc. hexane;
(b) 0.35 g. VOCl$_3$ and 0.35 g. tetrahydrofuran in 50 cc. hexane;
(c) 12.5 g. tridecylacrylate in 50 cc. hexane.

After 2 hours of polymerization, 50 g. of a transparent, very sticky plastic flexible mixed polymerizate are obtained having a reduced specific viscosity of 1.1 in toluene. According to analysis, approximately 20 weight percent of the copolymer is tridecylacrylate.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. An adhesive linear random copolymer of ethylene, propylene, the molar ratio of ethylene to propylene being from 1:0.8 to 1:3, respectively, and a functional derivative of an unsaturated carboxylic acid having 3-20 carbon atoms, said functional derivative being selected from the group consisting of an amide, a nitrile, an anhydride, and an ester of a lower alkanol, the molar percentage of the derivative being 1 to 10 percent based on the mols of ethylene and propylene in the copolymer, said copolymer having a molecular weight of 30,000–500,000.

2. A copolymer as defined by claim 1, wherein the molar ratio of ethylene to propylene is from 1:0.9 to 1:2.

3. A copolymer as claimed by claim 1, wherein there are 2–20 functional groups per thousand carbon atoms and not more than 1 double bond per thousand carbon atoms.

4. A copolymer of claim 1 wherein there are 5 to 10 functional groups per thousand carbon atoms and not more than one double bond per thousand carbon atoms.

5. A copolymer as defined by claim 1, wherein said functional acid derivative is selected from the group consisting of maleic anhydride, acrylonitrile, ethyl acrylate, and tridecylacrylate.

6. A copolymer as defined by claim 1 wherein the radicals of the carboxylic acid have been liberated by hydrolysis.

7. A copolymer as defined by claim 1 wherein the copolymer has a molecular weight of 80,000 to 200,000.

8. A copolymer as defined by claim 1 wherein said carboxylic acid is selected from the group consisting of maleic acid, fumaric acid, acrylic acid and crotonic acid.

9. A process for producing adhesive, vulcanizable linear random copolymers, which process comprises: copolymerizing a mixture of ethylene and propylene with a functional derivative of an unsaturated carboxylic acid having 3-20 carbon atoms, in contact with a Ziegler-type polymerization catalyst, said functional derivative being selected from the group consisting of an amide, a nitrile, an anhydride, and an ester of a lower alkanol, the mol percent of said functional derivative being 1–10 based on the mols of reacted mixture of ethylene and propylene, and said Ziegler-type catalyst being produced from (A) an organoaluminum compound from the group consisting of alkyl aluminum, aluminum alkyl chloride, and mixtures thereof, and
(B) a vanadium compound selected from the group consisting of vanadium oxychloride, vanadium tetrachloride, partial esters thereof, and mixtures thereof, the mol ratio of (A) to (B) being 1:1 to 2:1.

10. The process of claim 9 wherein said functional derivative is continuously added to the reaction medium during the active period of polymerization.

11. The process of claim 9 wherein said carboxylic acid is selected from the group consisting of maleic acid, fumaric acid and acrylic acid.

12. The process of claim 9 wherein said functional derivative is selected from the group consisting of maleic acid anhydride, acrylonitrile, or an aliphatic ester, the alcohol portion of said ester having 1–15 carbon atoms.

13. The process of claim 9 wherein the polymerization is conducted in an inert diluent medium.

14. The process of claim 9 wherein said Ziegler-type catalyst is produced from (A) an ethyl aluminum sesquichloride, and
(B) a compound selected from the group consisting of vanadyl trichloride, vanadium tetrachloride, the partial esters thereof, and mixtures thereof, the mol ratio of (A) to (B) being 5:1 to 50:1.

15. An article of manufacture comprising a metal base and a coating thereon which comprises the copolymer of claim 1.

16. An article of manufacture comprising a textile base and a coating thereon which comprises the copolymer of claim 1.

References Cited by the Examiner

UNITED STATES PATENTS

| | | | |
|---|---|---|---|
| 2,395,381 | 2/1946 | Squires | 260—88.1 |
| 2,396,785 | 3/1946 | Hanford | 260—78 |
| 2,599,119 | 6/1952 | McQueen | 260—78.5 |
| 3,117,110 | 1/1964 | Madge | 260—80.5 |

FOREIGN PATENTS 1,030,562　1/1964　Germany.

MURRAY TILLMAN, *Primary Examiner.*

P. LIEBERMAN, *Assistant Examiner.*